United States Patent
Van Bruggen

[19]

[11] Patent Number: 5,803,118

[45] Date of Patent: Sep. 8, 1998

[54] METERED FEED VALVE

[76] Inventor: Eugene E. Van Bruggen, 4311 330th St., Sheldon, Iowa 51201

[21] Appl. No.: 859,383

[22] Filed: May 20, 1997

[51] Int. Cl.$^6$ ................................................. F16K 11/065
[52] U.S. Cl. ..................................... 137/625.34; 137/874
[58] Field of Search ......................... 137/625.33, 625.34, 137/872, 874; 222/249, 275, 440

[56] References Cited

U.S. PATENT DOCUMENTS

| | | | |
|---|---|---|---|
| 2,518,574 | 8/1950 | Shopeceh | 137/874 |
| 3,805,833 | 4/1974 | Teed | 137/872 |
| 4,157,848 | 6/1979 | Smoot | 137/874 X |

*Primary Examiner*—John Fox

[57] ABSTRACT

A valve device adapted to meter the amount of any specific type of particulate matter—particularly livestock feed—being introduced into a mixture. The device uses a pair of compartments in a cylinder, the compartments being defined by pistons and using adjustments to control the size of the compartment.

7 Claims, 1 Drawing Sheet

METERED FEED VALVE

BACKGROUND AND SUMMARY OF THE INVENTION

This invention pertains to devices to meter measured quantities of particulate matter into a mixture. It is specifically useful for livestock feed mixtures, but may be readily adaptable to similar mixtures of other material.

Livestock feed currently comprises a mixture of at least one kind of grain supplemented by one or more feed additives all of which are mixed in specific proportions to accomplish a certain desired ration for any particular type of livestock. Because of the desire for specific rations, various devices have been used to provide the proportions of material in as close to the desired amounts as possible.

Among the systems used have been auger conveyers which may be timed to run only a limited time to deliver the correct proportionate amount. Another system has used a measuring bin to be filled to a desired level by a conveyor and then dumped into a mixture. Or a conveyor may deliver an amount to a weighing device adapted to stop delivery upon having received the desired weight. Each of these has certain drawbacks such as inaccuracy of the timed conveyor or the necessity of stopping upon having received a certain desired value or weight of material.

By the present invention, applicant provides a system which can be readily controlled by electronic devices to deliver measured volumes of mixture components in a nearly continuous stream. Adjustment may be possible in the device where small amounts are indicated.

DESCRIPTION

Figure 1:
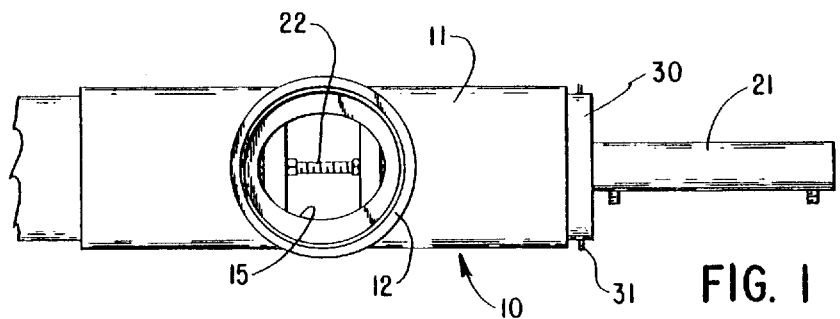
FIG. 1 is a top plan view of the valve device.

Briefly this invention comprises a valve mechanism for measuring and delivering a measured amount of particulate material from a storage place to a mixing place, or to the place of feeding the livestock.

More specifically and referring to the drawings, the valve consists of a housing 10. As shown, that housing is built up of a series of parts including a transverse pipe 11, an inlet part 12 and outlet collection housing 13. It will be seen that the housing could be formed as a single piece provided the tubular transverse opening and the other channels for passage of the material were in place.

The feed material enters the housing at the top and flows through the inlet 12 and to an opening 15 in the pipe 11 through which the material—if unimpeded—would flow into the chamber formed by the pipe. In the bottom of the pipe 11 are two holes 16 similar to each other. These two holes 16 are axially spaced on the pipe 11 by a distance greater than the distance of the opening 15 and lead into a roughly triangular shaped collection portion or outlet housing 13. As can be seen, both openings dump into the catchment.

The valve operation is provided by a multiple-piston valve member including a piston rod 20 adapted to be directly operated by a piston and cylinder assembly 21, preferable pneumatically controlled.

Figure 2:
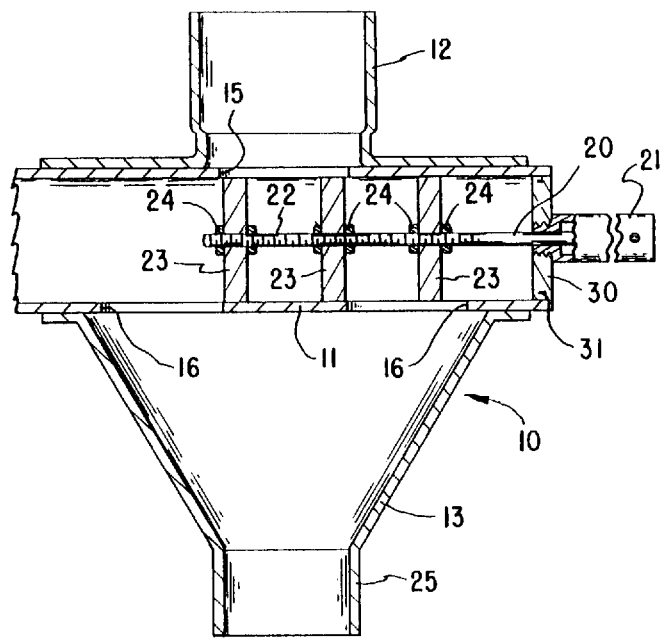
FIG. 2 is a medial sectional view of the device of FIG. 1 showing the internal working parts
Figure 3:
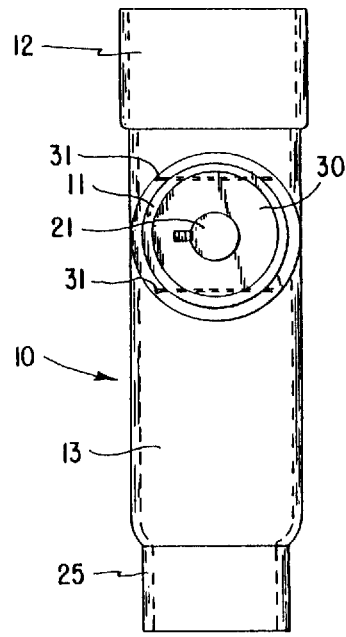
FIG. 3 is an end elevational view of the complete valve device.

In the preferred embodiment shown in FIG. 2, the rod 20 has a long threaded end 22 extending through a series of three pistons 23. These pistons are held in place subject to adjustment by nuts 24 threaded onto the threaded end 22 and against both sides of each piston 23. It will be evident that each pair of pistons 23 combined with the wells of the pipe 11 now form an adjustably sized chamber. Adjustment is possible by moving the pistons 23 further from or closer to each other, thus changing the volume of the chamber between the pistons. However, the rim of each piston 23 must be broad enough to cover enough of the opening 15 to prevent spillage of material beyond the chambers. Thus, the pistons are shown as relatively thick pieces. It will be apparent that thinner material could be used but then a wider rim would need to be provided.

In use, the valve is inserted between a storage bin not shown above the valve and mixing bin (also not shown) below the valve. Material from the storage bin flows into the inlet 12 towards the opening 15. When the pistons 23 are either fully to one side or the other, the material will flow into one chamber, but be held there because the exit openings 16 do not extend to the center position of the pipe 11. When the pistons are moved to an opposite position, the material in the full chamber will drop through the opening 16 into the catchment 13 and will flow from there through an outlet 25. Each back and forth cycle of the pistons thus, will result in successive filling and emptying of the chambers. By properly counting the operation of the pistons, a measured amount of material can be delivered.

For finer measurement, the position of the piston 23 on the rod 20 can be varied to allow smaller or larger chambers between the pistons so that the measurement can be adapted to specific needs.

Figure 4:
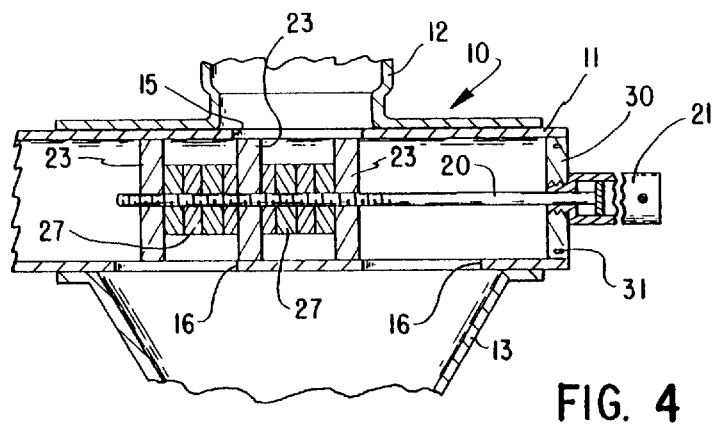
FIG. 4 is a partial sectional view similar to FIG. 2 showing an alternative type of adjustment for the size of the delivery chambers.

An alternative arrangement to vary the size of the metering chamber is shown in FIG. 4. Instead of adjusting the position of the pistons 23 on the rod 20, a series of bushings 27 may be used to fill part of the space between the pistons and therefore to diminish the size of the chamber. Gradations of sizes of the bushings 27 will make possible a large number of different sized chambers.

In either embodiment, an electronic control can be used to time the interval between operations or to count the number of cycles to control the volume of material delivered to the mixer or the feeding area.

For ease of access, an end wall 30 may be removably installed in one end of the pipe 11. The rod 20 is journalled in said end wall 30 and the entire assembly may be held in place by pins 31 extending through the walls of the pipe 11 and through parts of the end wall 30. By removing the pins 31, the wall 30 and the assembled pistons may be removed for adjustment as may be desired.

I claim as my invention:

1. A valve device for regulating the value of flow of a granular material, said valve comprised of a housing, a tubular channel formed laterally of said housing, a inlet in said housing having a passageway into said channel, at least two outlets formed in said channel, said outlets being axially spaced apart, and control means forming chambers in said channel for delivering said granular material from said inlet alternately to said outlets.

2. The valve device of claim 1 in which said outlets discharge into a triangular shaped collection having, said collection housing being designed to direct said material into a single exit tube.

3. The valve device of claim 1 in which said control means includes a rod, at least three pistons mounted on said rod and spaced apart to form the chambers in said tubular channel, said rod being movable axially of said channel to move said chambers from a position beneath said inlet to a position over one of said outlets.

4. The valve device of claim 3 which said pistons are adjustably spaced apart on said rod, adjustment of said pistons being effective to vary the volume of said chambers.

5. The valve device of claim 3 in which bushings are removable fitted onto said rod, said bushings being effective to vary the volume of said chambers between said pistons.

6. The valve device of claim 3 in which an end wall is removably fitted into one end of said tubular channel, said rod being slidably journalled in said end wall.

7. The valve device of claim 6 in which a control device is mounted on said end wall and is connected to said rod whereby said control device controls movement of said rod and its pistons.

* * * * *